(12) United States Patent
Vargantwar et al.

(10) Patent No.: US 12,058,560 B2
(45) Date of Patent: *Aug. 6, 2024

(54) SYSTEMS AND METHODS FOR CLASSIFYING TRAFFIC FLOWS TO ENABLE INTELLIGENT USE OF SPECTRUM

(71) Applicant: Verizon Patent and Licensing Inc., Basking Ridge, NJ (US)

(72) Inventors: Sachin Vargantwar, Cumming, GA (US); Maulik Shah, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 391 days.

This patent is subject to a terminal disclaimer.

(21) Appl. No.: 16/948,356

(22) Filed: Sep. 15, 2020

(65) Prior Publication Data
US 2020/0413284 A1    Dec. 31, 2020

Related U.S. Application Data

(63) Continuation of application No. 16/248,179, filed on Jan. 15, 2019, now Pat. No. 10,791,479.

(51) Int. Cl.
*H04W 28/02* (2009.01)
*H04B 17/318* (2015.01)
(Continued)

(52) U.S. Cl.
CPC ...... *H04W 28/0268* (2013.01); *H04B 17/318* (2015.01); *H04W 16/14* (2013.01);
(Continued)

(58) Field of Classification Search
CPC ............. H04W 28/0268; H04W 16/14; H04W 72/0453; H04W 74/0808; H04W 88/085; H04B 17/318
See application file for complete search history.

(56) References Cited

U.S. PATENT DOCUMENTS 10,506,594 B2 * 12/2019 Richards ........... H04W 28/0278
10,516,569 B2   12/2019 Lindoff et al.
(Continued)

OTHER PUBLICATIONS

Bougioukos, "Building network intelligence—Traffic classification", Nokia Networks, Jan. 16, 2017, 20 pages.
(Continued)

*Primary Examiner* — Rhonda L Murphy

(57) ABSTRACT

A base station may be associated with a primary cell to communicate with a user equipment (UE) in a licensed frequency band and at least one secondary cell to communicate with the UE in an unlicensed frequency band. The base station may receive a traffic flow associated with an application executing at the UE and assign the traffic flow to either the primary cell or the at least one secondary cell based on a classification associated with the traffic flow. For example, the traffic flow may be assigned to the primary cell based on the classification indicating that the application is executing at the UE in a foreground state or to the at least one secondary cell based on the classification indicating that the application is executing at the UE in a background state.

20 Claims, 6 Drawing Sheets

(51) Int. Cl.
*H04W 16/14* (2009.01)
*H04W 72/0453* (2023.01)
*H04W 74/0808* (2024.01)
*H04W 88/08* (2009.01)

(52) U.S. Cl.
CPC ... *H04W 72/0453* (2013.01); *H04W 74/0808* (2013.01); *H04W 88/085* (2013.01)

(56) References Cited

U.S. PATENT DOCUMENTS

| | | |
|---|---|---|
| 2015/0163805 A1 | 6/2015 | Cattoni et al. |
| 2016/0066195 A1* | 3/2016 | Moon ................ H04L 27/0006 455/454 |
| 2016/0073428 A1* | 3/2016 | Vutukuri ........... H04W 72/1215 370/329 |
| 2016/0261472 A1 | 9/2016 | Tubi et al. |
| 2017/0034756 A1* | 2/2017 | Faccin ................ H04W 28/065 |

OTHER PUBLICATIONS

Kwon, et al., "Licensed-Assisted Access to Unlicensed Spectrum in LTE Release 13", IEEE Communications Magazine on L TE Evolution, Apr. 25, 2016, 10 pages.

\* cited by examiner

SYSTEMS AND METHODS FOR CLASSIFYING TRAFFIC FLOWS TO ENABLE INTELLIGENT USE OF SPECTRUM

RELATED APPLICATION

This application is a continuation of U.S. patent application Ser. No. 16/248,179, entitled "SYSTEMS AND METHODS FOR CLASSIFYING TRAFFIC FLOWS TO ENABLE INTELLIGENT USE OF SPECTRUM", filed Jan. 15, 2019 (now U.S. Pat. No. 10,791,479), which is incorporated herein by reference.

BACKGROUND

User equipment may be capable of communicating using one or more radio access technologies. For example, some user equipment may be capable of communicating with a radio access network (RAN) (e.g., a long term evolution (LTE) network) associated with a mobile network operator over a licensed radio frequency (RF) spectrum band and/or an unlicensed RF spectrum band (e.g., for LTE in unlicensed spectrum service, such as LTE for Unlicensed (LTE-U), Licensed-Assisted Access (LAA), Enhanced LAA (eLAA), and/or the like).

A licensed RF spectrum band may refer to an RF spectrum band that has been licensed to the mobile network operator by an appropriate regulatory agency (e.g., the Federal Communications Commission (FCC) in the United States). An unlicensed RF spectrum band may refer to an RF spectrum band (e.g., the 2.4 gigahertz (GHz) and 5 GHz RF spectrum bands) that has not been licensed and is open for shared use by any device that complies with regulatory agency rules for communicating via the RF spectrum band.

DETAILED DESCRIPTION OF PREFERRED EMBODIMENTS

Figure 1A:
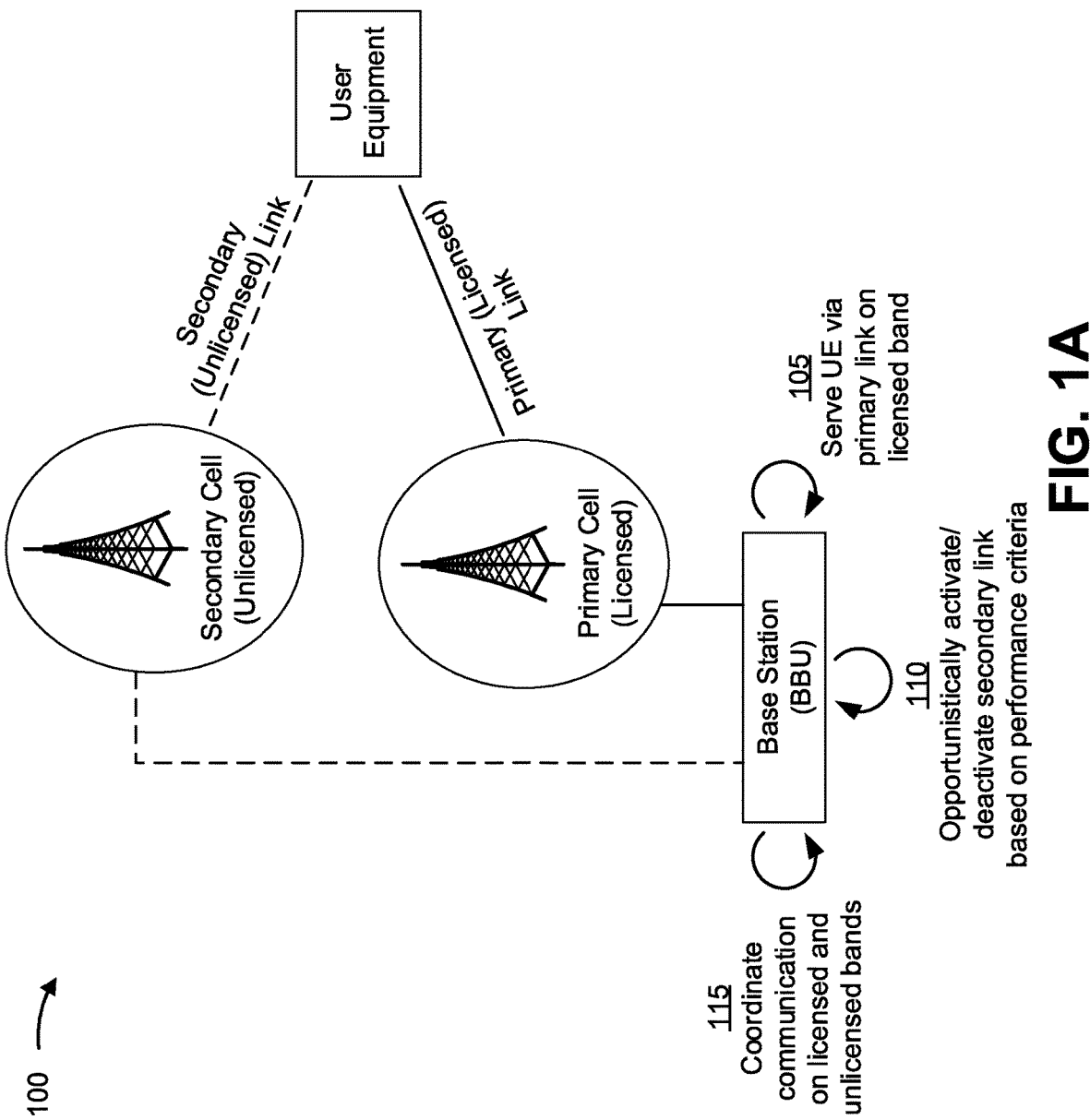
FIGS. 1A-1C are diagrams of one or more example implementations described herein.

The following detailed description of example implementations refers to the accompanying drawings. The same reference numbers in different drawings may identify the same or similar elements.

To accommodate increasing traffic demands, there have been various efforts to improve spectral efficiency in wireless networks and thereby increase network capacity (e.g., via use of higher order modulations, advanced multi-input multi-output (MIMO) antenna technologies, multi-cell coordination techniques, and/or the like). Another way to potentially improve network capacity is to expand system bandwidth. However, available spectrum in lower frequency bands that have traditionally been licensed or otherwise allocated to mobile network operators has become very scarce. Accordingly, various technologies have been developed to enable operation of a Long-Term Evolution (LTE) system in unlicensed spectrum. For example, Licensed-Assisted Access (LAA) uses carrier aggregation on a downlink to combine LTE in a licensed frequency band with LTE in an unlicensed frequency band (e.g., the 5 GHz band already populated by wireless local area network (WLAN) or "Wi-Fi" devices). In another example, Enhanced LAA (eLAA) technology enables both uplink and downlink LTE operation in unlicensed spectrum. When operating LTE in unlicensed spectrum (e.g., using LAA, eLAA, and/or the like), one challenge that arises is the need to ensure fair coexistence with incumbent (e.g., WLAN) systems that may be operating in the unlicensed spectrum.

For example, prior to gaining access to, and transmitting over, an unlicensed radio frequency spectrum band, a transmitting device may need to perform a listen-before-talk (LBT) procedure to contend for access to the unlicensed radio frequency spectrum band. The LBT procedure may include performing a clear channel assessment (CCA) procedure to determine whether a channel of the unlicensed radio frequency spectrum band is available. In particular, the CCA procedure may include detecting an energy level on the channel of the unlicensed radio frequency spectrum band and determining whether the energy level satisfies (e.g., is less than or equal to) a threshold. When the energy level satisfies the threshold, the CCA procedure is deemed to be successful and contention to access the channel of the unlicensed radio frequency spectrum band may be successful. When the energy level does not satisfy the threshold, the CCA procedure is unsuccessful and contention to access the channel of the unlicensed radio frequency spectrum band may be unsuccessful.

When the CCA procedure results in a determination that the channel of the unlicensed radio frequency spectrum band is unavailable (e.g., because the energy level detected on the channel indicates that another device is already using the channel), the CCA procedure may be performed for the channel again at a later time. In environments in which the transmitting device may be starved of access to a channel of an unlicensed radio frequency spectrum band due to WLAN activity, an extended CCA procedure may be employed to increase the likelihood that the transmitting device will successfully contend for access to the channel of the unlicensed radio frequency spectrum band. The extended CCA procedure may involve the performance of a random quantity of CCA procedures (from 1 to q), in accordance with an extended CCA counter. Once the transmitting device senses that the channel has become clear, the transmitting device may start a random wait period based on the extended CCA counter and start to transmit if the channel remains clear over the random wait period.

Accordingly, although a base station in a wireless network can use unlicensed spectrum to achieve faster downlink data rates, provide a more responsive user experience, offload traffic from a licensed spectrum, and/or the like, the need to ensure fair coexistence with the incumbent systems (e.g., WLAN devices) may hamper efficient usage of the unlicensed spectrum. For example, even when there is no interference, the LBT procedure used to ensure that no other devices are already using the channel introduces a delay before transmissions can start, which may degrade user experience, result in unacceptable performance for latency-sensitive or delay-sensitive applications, and/or the like. Furthermore, these problems may be exacerbated when the initial CCA procedure is unsuccessful, as the transmitting device can transmit on the channel only after performing an additional quantity of CCA procedures and determining that the channel has become clear and remained clear for a random wait period.

Some implementations described herein may configure a base station to opportunistically activate a secondary cell used to communicate with a user equipment (UE) via an unlicensed spectrum and send, to the UE via the secondary cell, downlink traffic relating to one or more applications executing in a background state at the UE. Accordingly, the base station may assign downlink traffic relating to an application executing at the UE in a foreground state to a primary cell used to communicate with the UE via a licensed spectrum. In some implementations, the downlink traffic may be classified as relating to the application executing in the foreground state or relating to the one or more applications executing in the background state based on one or more traffic classification methods (e.g., based on packet contents, statistical analysis of network traffic attributes, a UE indication as to whether a given application is executing in the foreground or background state, and/or the like).

In this way, the primary (licensed) cell can be used to handle traffic associated with certain applications that may be executing in the foreground state, including delay-sensitive or latency-sensitive applications (e.g., video calls, video streaming, gaming, navigation, and/or the like), which may avoid a need to perform an LBT procedure prior to transmitting the delay-sensitive or latency-sensitive traffic and thus improve response time, satisfy an applicable service level agreement (SLA) and/or Quality of Service (QoS) requirements, and/or the like. Furthermore, by using the secondary (unlicensed) cell to handle traffic associated with certain applications that may be executing in the background state (e.g., application refreshes, email downloads, data backups, and/or the like), the UE may receive the traffic when the unlicensed resources can be put to use (e.g., after the LBT procedure) without causing any user-perceptible performance degradation. In this way, by assigning foreground traffic to the primary cell and assigning background traffic to the secondary cell, the base station can use the unlicensed spectrum associated with the secondary cell to more efficiently offload traffic from the primary cell, to boost a downlink data rate for the UE, and/or the like, without hampering performance of the foreground traffic or causing user-perceptible delays with respect to the background traffic.

Figure 1B:
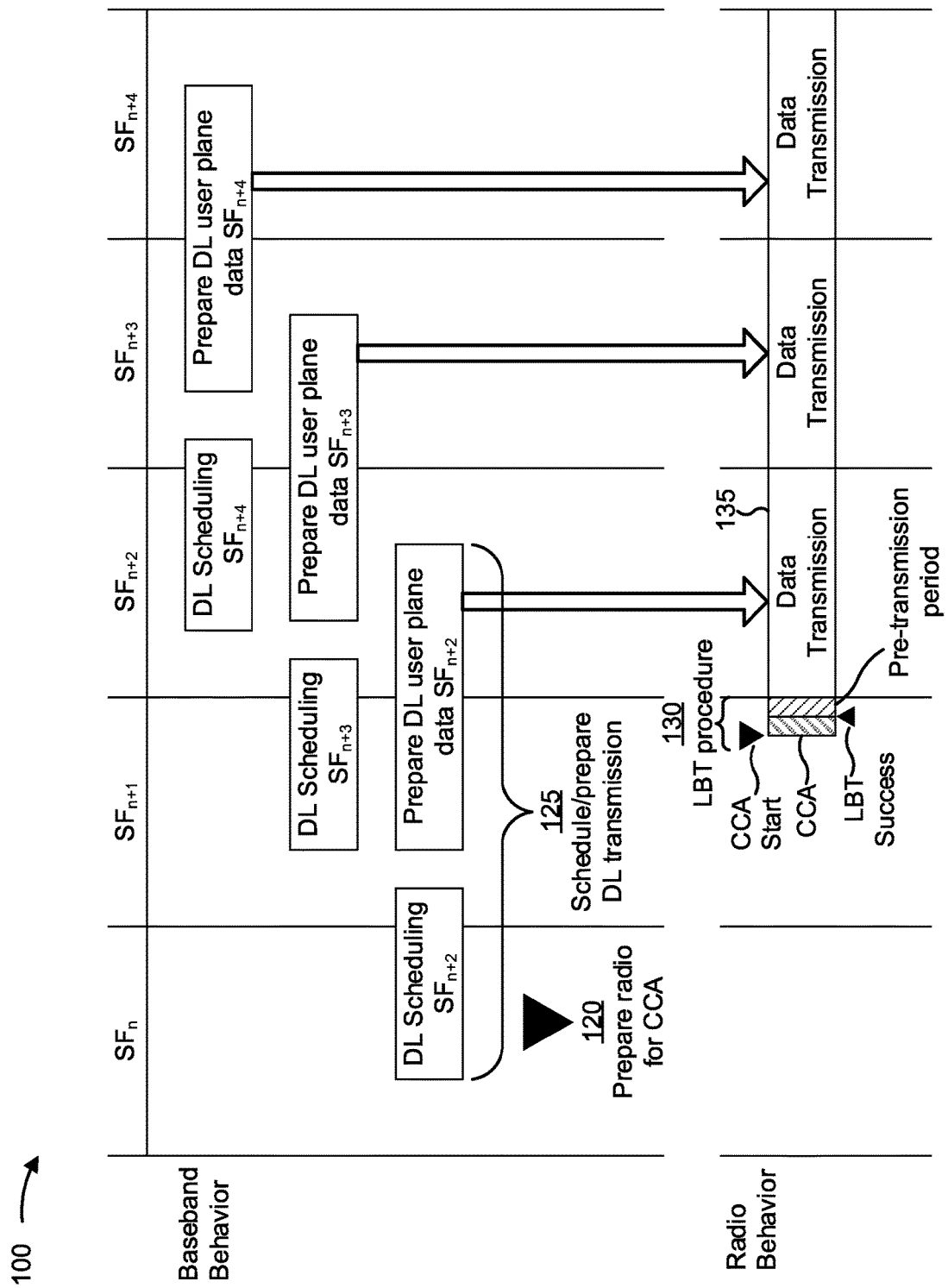
Figure 1C:
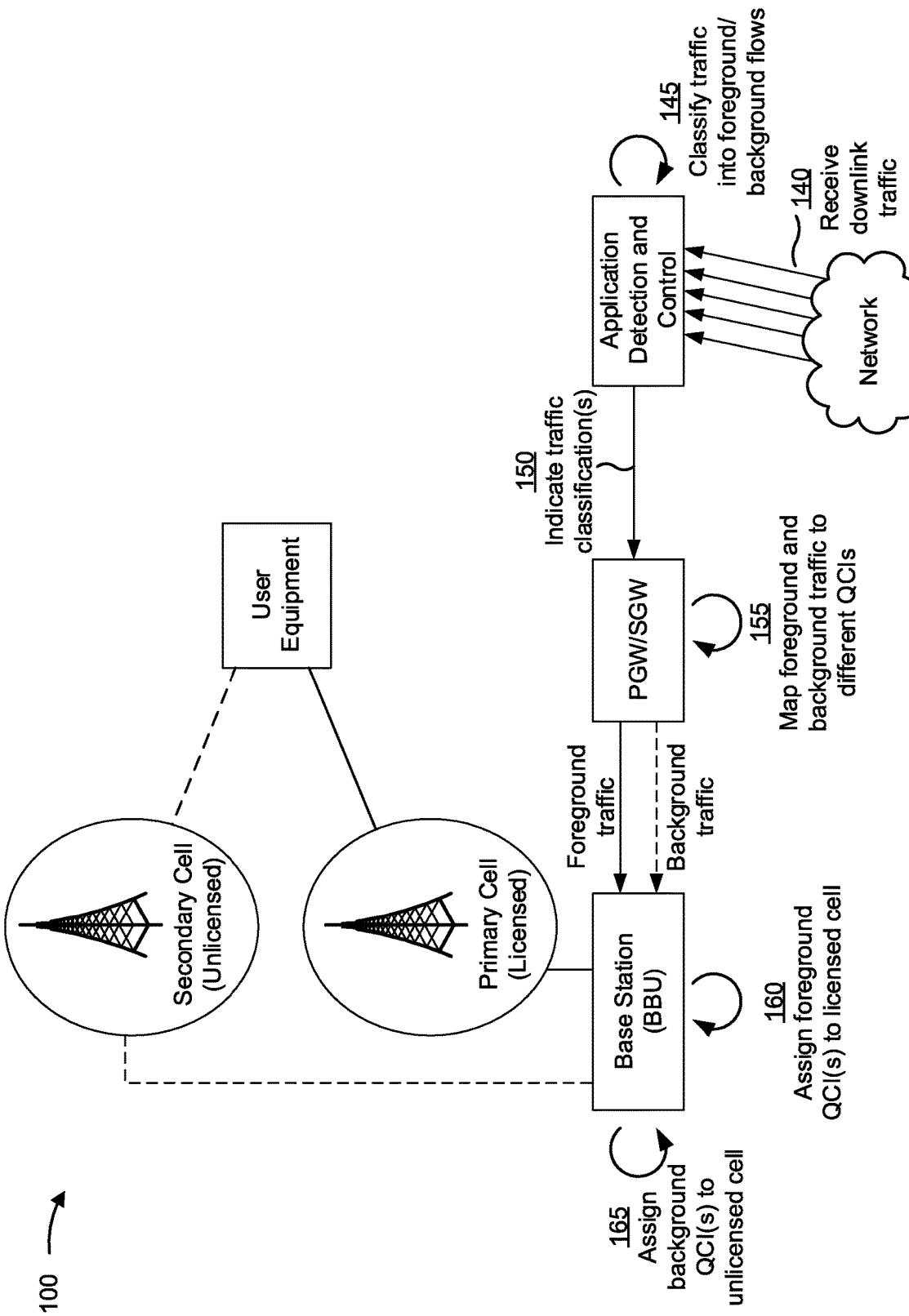

FIGS. 1A-1C are diagrams of one or more example implementations 100 described herein. More particularly, in implementation(s) 100, a base station that is serving a user equipment (UE) may be associated with a primary cell that includes one or more radio units configured to communicate with the UE in a licensed frequency band and at least one secondary cell that includes one or more radio units configured to communicate with the UE in an unlicensed frequency band. For example, in some implementations, the secondary cell can communicate with the UE via the unlicensed frequency band in a manner that may be supplemental to operation in the licensed frequency band by utilizing one or more unlicensed carriers in conjunction with a persistent anchor carrier operating in the licensed frequency band. In some implementations, the base station may employ carrier aggregation to manage the different component carriers, with the persistent anchor carrier used in the primary cell and the one or more unlicensed carriers used in the secondary cell(s).

In this way, the primary cell may be used to carry substantially all control and signaling information via the persistent anchor carrier, which may provide substantial reliability and a seamless experience as the UE moves in and out of a coverage area associated with the secondary cell(s). Furthermore, in this way, the secondary cell(s) can be opportunistically activated and/or deactivated as desired to provide additional downlink and/or uplink capacity, offload traffic from the primary cell, and/or the like, which conserves network resources in the primary cell, allows the base station to handle larger traffic loads than could be handled via the licensed frequency band alone, improves user experience by enabling faster data rates via the downlink and/or uplink carrier aggregation, and/or the like.

In some implementations, the base station may be implemented according to a centralized radio access network (C-RAN) architecture, which may alternatively be referred to as a coordinated RAN architecture, an Enhanced RAN architecture, and/or the like. In particular, in the C-RAN architecture, the base station may be separated into a baseband unit (BBU) and multiple remote radio heads (RRHs) that can be controlled by the BBU. In some implementations, the BBU may provide a physical interface between the base station and a core network, provide an interface to the multiple RRHs, process and transfer uplink and downlink data packages, schedule transmissions to and/or from UEs, and/or the like. The RRHs may contain the radio frequency (RF) circuitry, analog-to-digital converters, digital-to-analog converters, and/or the like for the associated base station. In some implementations, the BBU may be connected to the RRHs via a "fronthaul" fiber link, which allows the RRHs to be installed at or near an antenna atop a cellular tower.

In this way, the C-RAN architecture may allow more flexibility in network planning and deployment, as the BBU can be located in a centralized location that may be geographically distant (e.g., several kilometers away) from the RRHs. Furthermore, in this way, multiple BBUs can be co-located, pooled, or otherwise interconnected at the centralized location to provide a low-cost, high-reliability, low-latency, and high-bandwidth base station infrastructure.

Further still, using the C-RAN architecture to implement the base station may simplify radio resource management in a carrier aggregation environment, such as in implementation(s) 100 where the base station may include a first RRH in the primary cell to transmit RF signals to and receive RF signals from the UE in the licensed frequency band, a second RRH in the secondary cell to transmit RF signals to and receive RF signals from the UE in the unlicensed frequency band (e.g., in an eLAA deployment) or alternatively only transmit RF signals to the UE in the unlicensed frequency band (e.g., in an LAA deployment), and a centralized BBU configured to control the first RRH and the second RRH. In this way, by centralizing BBU processing and radio resource control, multiple baseband units can work in unison to schedule transmissions to and from UEs, spectral efficiency may be improved because the multiple baseband units can coordinate among themselves, the multiple baseband units can share information to reduce interference among transmissions in licensed and unlicensed frequency bands that may occur in overlapping geographical space(s), and/or the like.

As shown in FIG. 1A, and by reference number 105, the base station may serve the UE via a primary link on the licensed frequency band. As shown in FIG. 1A, the primary link may be established between the UE and the one or more radio units in the primary cell to anchor communications between the UE and the base station in the licensed frequency band. In some implementations, the primary cell may use the licensed frequency band to handle control plane signaling, mobility management functions, user plane data, security, Quality of Service (QoS), and/or the like. In this way, communications between the UE and the base station may be firmly anchored via the primary cell, which may provide a robust and efficient connection because the licensed frequency band is exclusively occupied by a mobile network operator associated with the base station and not shared with any other systems.

As further shown in FIG. 1A, and by reference number 110, the base station may activate a secondary link from the secondary cell(s) based on one or more performance criteria. For example, in some implementations, the base station may determine radio conditions in the primary cell and/or the secondary cell, information relating to an uplink and/or downlink traffic demand, and/or the like (e.g., based on one or more measurements received from the UE via the primary cell, measurements obtained at the base station, and/or the like). Accordingly, in some implementations, the base station may activate the secondary link between the UE and the secondary cell(s) based on determining that the one or more performance criteria are satisfied. For example, the secondary link may be activated based on determining that radio conditions in the secondary cell(s) are favorable, that radio conditions in the primary cell are unfavorable, that the UE has a high uplink and/or downlink traffic demand that could be satisfied by using the unlicensed spectrum to boost a data rate for the UE, that the primary cell has a high overall traffic demand that could be lessened by offloading some traffic to the secondary cell(s), and/or the like.

As further shown in FIG. 1A, and by reference number 115, the base station may coordinate communication on the licensed and unlicensed frequency bands via the primary cell. In particular, as noted above, an RRH at the primary cell may communicate with the UE via a persistent anchor carrier operating in a radio frequency band licensed to the mobile network operator associated with the base station. Accordingly, control and signaling information may be conveyed between the UE and the base station via the primary cell such that the secondary cell(s) can be opportunistically activated and/or deactivated as desired to improve performance (e.g., by offloading traffic from the licensed frequency band to the unlicensed frequency band to improve capacity, boost a data rate for the UE, increase coverage, and/or the like).

In this way, substantially the same technology (e.g., LTE) can be used to enable wireless communications between the base station and the UE via both the licensed and unlicensed frequency bands. In this way, the mobile network operator may support seamless services across both the licensed and unlicensed frequency bands, conserve resources by using common core network and network management systems for both the licensed and unlicensed frequency bands, and/or the like. Furthermore, because communications between the base station and the UE are anchored in the licensed frequency band and the unlicensed frequency band is used only for supplemental coverage, throughput, capacity, and/or the like via carrier aggregation, offloading traffic to the secondary cell(s) may relieve loads in both the primary (licensed) cell and on incumbent WLAN systems. Furthermore, because the unlicensed frequency band is open for shared use by any device that complies with applicable rules for communicating via the unlicensed frequency band, using the secondary (unlicensed) link to supplement or augment communications via the primary (licensed) link may provide the mobile network operator with additional bandwidth to serve UEs without having to expend resources to acquire and manage more licensed spectrum (e.g., hardware resources for additional communication infrastructure, financial resources to pay for the licensed spectrum and/or the additional communication infrastructure, computational, financial, and/or human resources to deploy and maintain the communication infrastructure, and/or the like).

In some implementations, as mentioned elsewhere herein, the unlicensed frequency band is shared with incumbent systems (e.g., WLAN devices), and as a result, coordinating communication on the licensed frequency band and the unlicensed frequency band may further involve performing a listen-before-talk (LBT) procedure prior to transmitting over the unlicensed frequency band. In particular, the LBT procedure may be used to dynamically select a clear channel in the unlicensed frequency band and thereby avoid interfering with existing communications in the unlicensed frequency band. Alternatively, if there is no clear channel available in the unlicensed frequency band, the LBT procedure may include further measures to share a channel fairly with the existing communications in the unlicensed frequency band.

When the base station is implemented according to the C-RAN architecture described elsewhere herein, performing the LBT procedure prior to enabling any transmissions over the unlicensed spectrum may hamper efficient use of the unlicensed spectrum. This is because the BBU typically schedules data transmission blocks in advance while waiting for the LBT procedure to find a clear channel and/or identify transmission blocks in a manner that may ensure that an occupied channel is shared fairly with other systems (e.g., WLAN devices).

For example, as shown in FIG. 1B, scheduling transmissions to and/or from the UE via the unlicensed frequency band may include various operations that are distributed between the BBU (baseband behavior) and the RRH(s) at the secondary cell(s) that communicate with the UE via the unlicensed frequency band (radio behavior). As shown in FIG. 1B, and by reference number 120, in a given subframe (depicted in FIG. 1B as $SF_n$), the BBU may prepare the RRH(s) in the secondary cell(s) to start performing a clear channel assessment (CCA) associated with the LBT procedure in a subsequent subframe (depicted in FIG. 1B as $SF_{n+1}$). As shown in FIG. 1B, and by reference number 125, the BBU may optimistically schedule one or more downlink transmissions to the UE in a subframe to follow the LBT procedure and start to prepare downlink user data for the scheduled downlink transmissions while awaiting results of the CCA.

As shown in FIG. 1B, and by reference number 130, the RRH(s) at the secondary cell(s) may start the CCA in the scheduled subframe ($SF_{n+1}$ in FIG. 1B). In an embodiment, the CCA is able to find a clear channel, resulting in the LBT procedure succeeding. As shown in FIG. 1B, and by reference number 135, the previously scheduled data transmissions can be sent on a downlink to the UE via the unlicensed frequency band following a pre-transmission wait period. Alternatively, when the CCA is unable to find a clear channel in the unlicensed frequency band (e.g., because detected energy levels on each channel indicate that other devices are already using the channels), another CCA procedure may be performed at a later time. If the base station continues to be starved of access to a channel in the unlicensed frequency band (e.g., due to detected energy levels indicating ongoing WLAN activity), an extended CCA procedure as described elsewhere herein may be employed in order to increase the likelihood that the base station will successfully contend or fairly share access to a channel in the unlicensed frequency band.

In this way, scheduling the downlink transmissions in advance may ensure that there will be minimal to no delay in the transmissions following a successful LBT procedure, while also avoiding interference with any existing communications in the unlicensed frequency band. However, even in the best-case scenario, the need to perform the LBT procedure before initiating transmissions via the unlicensed frequency band may result in hampered or inefficient use of the unlicensed frequency band. For example, even in the case where there is no interference, there will be a delay of at least a few milliseconds while waiting for the LBT procedure to complete. In the case of a delay-sensitive or latency-sensitive application (e.g., a video call having a low-latency service level agreement, Quality of Service (QoS) requirement, Quality of Experience (QoE) requirement, and/or the like), a delay of even a few milliseconds may result in unacceptable performance. Indeed, a user-perceptible delay may be undesirable for any application with which a user is actively engaged (e.g., applications that the UE is running in the foreground).

Furthermore, the delay that the LBT procedure introduces may be worse in cases where the LBT procedure is unable to immediately find a clear channel. For example, as the RRH performs the extended CCA, additional time may elapse before transmissions to the UE can be performed via the unlicensed frequency band. In addition, there may be wasted network resources, processing resources, memory resources, and/or the like due to the need to schedule downlink transmissions to the UE in advance. For example, as shown in FIG. 1B, the BBU schedules an initial downlink transmission via the unlicensed frequency band and starts to prepare downlink user plane data before the LBT procedure begins. If the LBT procedure does not find a clear channel right away, the resources that are expended to schedule the initial downlink transmission and to start preparing the downlink user plane data may be wasted.

Accordingly, in some implementations, an expectation of a user at the UE may be exploited to intelligently determine which traffic to offload from the licensed frequency band to the unlicensed frequency band in a way that does not hamper user experience or degrade performance for latency-sensitive or delay-sensitive applications, while still employing the LBT procedure to avoid interference with existing communications via the unlicensed frequency band.

In particular, the user may have different expectations with respect to speed, delay, latency, performance, and/or the like depending on application(s) with which the user is actively engaging. For example, while the user is actively engaged in a voice call or a video call, emails may be synchronized in the background at substantially the same time even though the user may not be actively looking at the emails because the user is instead focused on the call. As a result, if the email synchronization were to be delayed a few milliseconds or a few seconds, the user is unlikely to even perceive the delay. Accordingly, based on this difference in behavior and/or expectation depending on whether the user is actively engaged with a given application or the application is running in the background, the base station can intelligently assign certain traffic flows to the primary (licensed) cell where transmissions can be sent immediately without waiting on an LBT procedure while other traffic flows that are less sensitive to speed, delay, latency, user experience, and/or the like can be assigned to the secondary (unlicensed) cell where transmissions can occur if and/or when unlicensed resources are available to put to use.

As shown in FIG. 1C, and by reference number 140, an application detection and control (ADC) network function may receive downlink traffic including one or more traffic flows that are destined for the UE. As further shown in FIG. 1C, and by reference number 145, the ADC network function may classify the downlink traffic into one or more foreground traffic flows and one or more background traffic flows. In some implementations, the one or more foreground traffic flows may generally include traffic relating to an application executing at the UE in a foreground state (e.g., an application that the user is actively using or otherwise engaging in an active manner) while the one or more background traffic flows may generally include traffic relating to one or more applications executing at the UE in a background state (e.g., applications with which the user is not actively engaging). In some implementations, certain types of applications that are latency-sensitive, delay-sensitive, and/or the like may be considered foreground applications (e.g., video calls, video streaming, gaming, navigation, and/or the like), while other delay-tolerant applications may be classified as background data (e.g., application refreshes, email downloads, data backups, and/or the like).

In some implementations, a default classification associated with a given application can dynamically change between foreground and background, depending on context. For example, while a traffic flow related to email synchronization may have a default designation as background data, in some cases the traffic flow may be reclassified as foreground data based on information indicating that the user is actively engaging with the email application (e.g., where the user refreshes the email application several times at a faster rate than is typically associated with email synchronization, this may indicate that the user is expecting an urgent email such that the traffic flow should be reclassified as foreground data).

In some implementations, the ADC network function may classify the downlink traffic into the foreground and background traffic flows based on one or more traffic classification methods. For example, in some implementations, the one or more traffic classification methods may use one or more machine learning algorithms to classify the downlink traffic based on statistical analysis of network traffic attributes (e.g., byte frequencies, distribution of packet sizes, packet inter-arrival times, and/or the like), based on packet contents (e.g., source and destination ports, source and destination IP addresses, application signatures, and/or the like), based on explicit signaling from the UE that identifies applications executing in the foreground state and the background state, and/or the like.

For example, in a port-based traffic classification method, the ADC network function may examine packets in the downlink traffic for well-known source and/or destination ports that are assigned to certain applications by the Internet Assigned Numbers Authority (IANA) (e.g., port 80 for web traffic, port 110 for certain email traffic, and/or the like). In this way, the port-based traffic classification method may offer a fast method to classify traffic without consuming substantial computing resources. Furthermore, because the port-based classification method does not have to inspect an application-layer payload, this method may be suitable for protecting user privacy and complying with Customer Proprietary Network Information (CPNI) restrictions.

In another example, an IP-based traffic classification method may follow a similar approach as the port-based method, in that the ADC network function may examine the packets in the downlink traffic for certain well-known source and/or destination IP addresses. Additionally, or alternatively, the IP-based traffic classification method may be combined with the port-based traffic classification method to implement a service-based traffic classification method. For example, a service may generally be defined as a triplet combining a well-known IP address, a well-known port, and a well-known protocol assigned to a specific application. In some implementations, the ADC network function may maintain a database of known services to ensure that the applications have accurate and updated mappings.

In a further embodiment, a statistics-based traffic classification method may use statistical characteristics associated with certain network traffic to determine the type of application and/or the specific application associated with the network traffic. For example, the statistical characteristics may relate to a distribution of packet size, packet inter-arrival times, traffic rates, and/or the like. Furthermore, in some implementations, the statistics-based traffic classification method may take into consideration certain factors such as network conditions, error rates, communication patterns (e.g., behavior of the UE), causality of application traffic, constant and unique characteristics associated with certain traffic categories (e.g., web, peer-to-peer, navigation, and/or the like). In this way, the statistics-based traffic classification method may identify traffic types without having to inspect packet contents, which may further protect user privacy. Furthermore, this method may provide a capability to identify the traffic types even if the underlying data is encrypted, because this method is agnostic to packet contents.

In some implementations, in a further embodiment, the UE may be configured with an operating system that has a capability to distinguish applications executing in the foreground from applications that are executing in the background (e.g., to conserve battery power, such as disabling location services, refreshes, and/or the like for applications that the UE is running in the background and reactivating such features if and/or when the application is brought to the foreground). Accordingly, in some embodiments, the UE may provide explicit signaling (e.g., via the primary cell) to indicate applications that are running in the foreground versus applications that are running in the background, and this indication may be provided to the ADC network function for use in classifying the downlink traffic into the foreground and background traffic flows.

In a further example, the ADC network function may perform deep packet inspection based on payload contents to classify the traffic into the foreground and background traffic flows. In general, deep packet inspection may be considered a highly accurate traffic classification method, although deep packet inspection may not be permitted in some implementations (e.g., where there are privacy or CPNI restrictions in place). However, when deep packet inspection is permitted, the ADC network function may use this method to inspect the actual payload of the downlink packets destined for the UE to search for patterns that match one or more unique application signatures. In this way, the deep packet inspection method may provide a reliable identification of the application associated with the traffic flow, even when the application uses random ports, tunneled traffic, and/or the like to disguise the application type.

In some embodiments, based on the ADC network function classifying the downlink traffic into foreground and background flows, the downlink traffic can be given different paths through the network based on whether the traffic includes foreground data or background data. For example, if an application does not need to be fast because the speed would not be perceived at the UE at that point in time, the traffic can be scheduled through the secondary cell(s) where the traffic can be sent to the UE via the unlicensed frequency band after some delay (e.g., once interference is gone, LBT procedures are complete, and/or the like). On the other hand, if the application is executing in the foreground or relates to a latency-sensitive or delay-sensitive service needing a faster response time, more throughput, less latency, and/or the like, the traffic may be scheduled on the licensed frequency band where the speed can be offered to complete the transaction faster (e.g., without having to first perform LBT procedures to find a clear channel).

As further shown in FIG. 1C, and by reference number 150, the ADC network function may indicate the traffic classification associated with each traffic flow (e.g., whether each traffic flow is considered foreground or background) to a gateway node (e.g., a packet data network gateway (PGW), a serving gateway (SGW), and/or the like). As further shown in FIG. 1C, and by reference number 155, the gateway node may map the foreground and background traffic to different Quality of Service (QoS) Class Identifiers (QCIs) to assist in scheduling the traffic at the base station. For example, a QCI generally refers to a mechanism that may be used in a wireless network to ensure that bearer traffic is allocated an appropriate QoS. As such, the QCIs mapped to the foreground and background traffic may effectively classify the foreground and background traffic into different classes that are given different treatment (e.g., priority levels) in the wireless network (e.g., a Guaranteed Bit Rate (GBR), Packet Loss Rate (PLR), best effort service, and/or the like).

Accordingly, in some implementations, a first set of one or more QCIs may be assigned to the foreground traffic flows and a second set of one or more QCIs may be assigned to the background traffic flows, wherein the first set of QCIs may generally have a higher priority level than the second set of QCIs. For example, the foreground traffic flows may be mapped to QCI(s) 8 and/or 9, while the background traffic flows may be mapped to QCI 10. Additionally, or alternatively, a set of available QCIs may be further sliced to provide differentiated treatment for different foreground traffic flows, different background traffic flows, and/or the like. In any case, the gateway node and the base station may be configured with an appropriate mapping between QCIs, foreground traffic flows, and background traffic flows, and this mapping may be used to dynamically assign certain traffic to either the primary cell that is anchored in licensed spectrum that is exclusively occupied by the mobile network operator associated with the base station or the secondary cell that provides supplemental coverage in unlicensed spectrum that is subject to LBT procedures to ensure fair coexistence with incumbent systems.

Accordingly, as further shown in FIG. 1C, and by reference number 160, the BBU at the base station may assign one or more traffic flows that are mapped to a foreground QCI to the primary (licensed) cell. As a result, the RRH in the primary cell may handle such traffic flows via the licensed frequency band without having to first verify that communications via the licensed frequency band would not interfere with any existing communications. As further shown in FIG. 1C, and by reference number 165, the BBU at the base station may assign one or more traffic flows that are mapped to a background QCI to the secondary (unlicensed) cell(s). As a result, the RRH(s) in the secondary cell(s) may handle such traffic flows via a clear channel in the unlicensed frequency band and/or in a manner that ensures fair coexistence with existing communications in an occupied channel of the unlicensed frequency band.

As indicated above, FIGS. 1A-1C are provided merely as one or more examples. Other examples can differ from what is described with regard to FIGS. 1A-1C.

Figure 2:
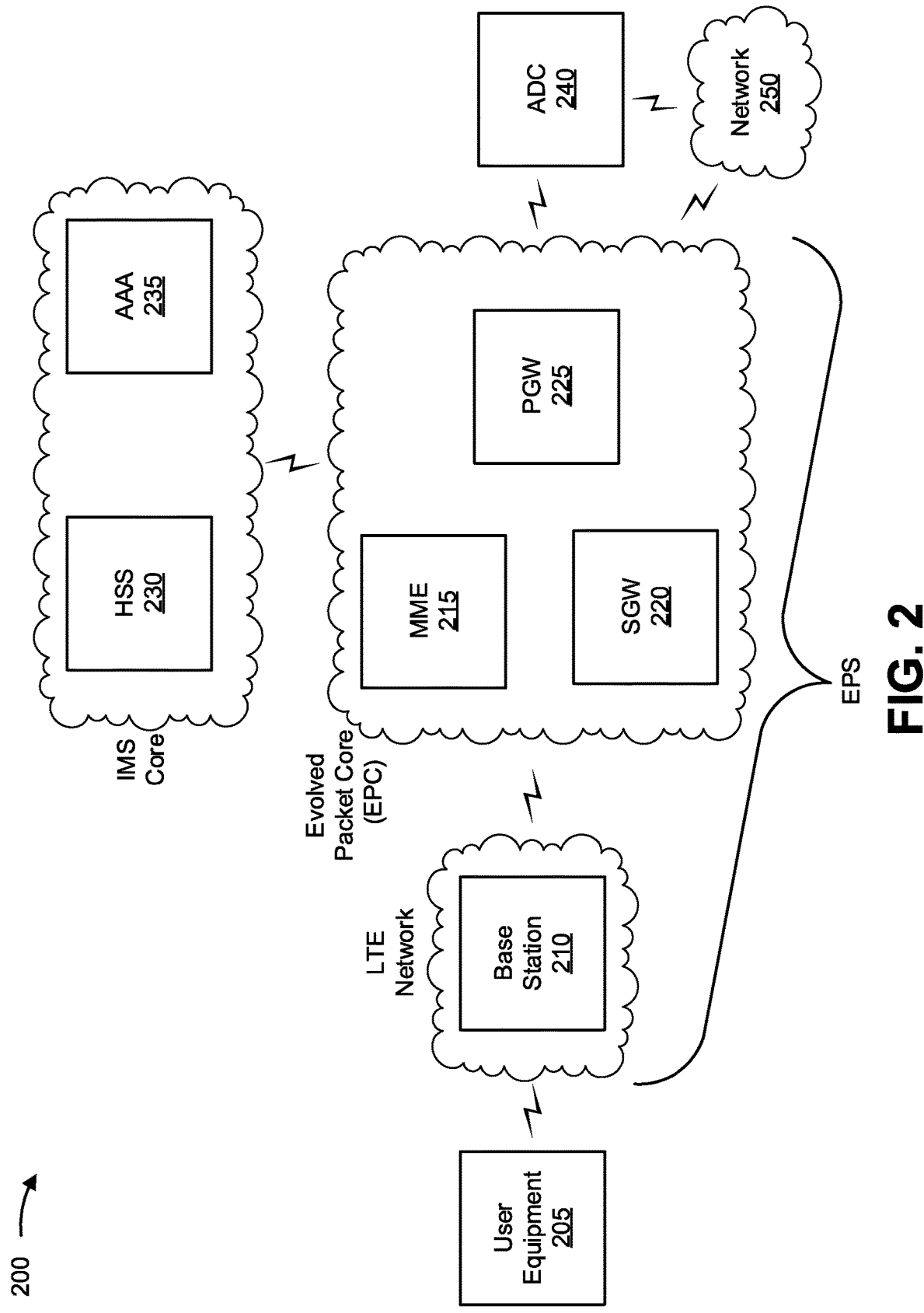
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user equipment (UE) 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235, an Application Detection and Control (ADC) component 240, and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a fifth generation (5G) network, and/or the like.

Environment 200 may include an evolved packet system (EPS) that includes an LTE network and/or an evolved packet core (EPC) that operate based on one or more third generation partnership project (3GPP) wireless communication standards. The LTE network may include a radio access network (RAN) that includes one or more base stations 210 that take the form of evolved Node Bs (eNBs) via which UE 205 communicates with the EPC. The EPC may include MME 215, SGW 220, and/or PGW 225 that enable UE 205 to communicate with network 250 and/or an Internet protocol (IP) multimedia subsystem (IMS) core. The IMS core may include HSS 230 and/or AAA 235, and may manage device registration and authentication, session initiation, etc., associated with UEs 205. HSS 230 and/or AAA 235 may reside in the EPC and/or the IMS core.

UE 205 includes one or more devices capable of communicating with base station 210 and/or a network (e.g., network 250). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 205 may send traffic to and/or receive traffic from network 250 (e.g., via base station 210, SGW 220, and/or PGW 225).

Base station 210 includes one or more devices capable of transferring traffic, such as audio, video, text, and/or other traffic, destined for and/or received from UE 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from UE 205 via an air interface. In some implementations, base station 210 may include a small cell base station, such as a base station of a microcell, a picocell, and/or a femtocell. Additionally, or alternatively, base station 210 may be associated with a primary cell that includes one or more radio units configured to communicate with UE 205 in a licensed frequency band and at least one secondary cell that includes one or more radio units configured to communicate with UE 205 in an unlicensed frequency band.

In some implementations, base station 210 may be implemented according to a centralized radio access network (C-RAN) architecture and/or another suitable distributed antenna architecture. For example, in some implementations, base station 210 may include a baseband unit (BBU) and multiple remote radio heads (RRHs) that can be controlled by the BBU. In some implementations, the BBU may provide a physical interface between base station and the EPC and/or IMS core, provide an interface to the multiple RRHs, process and transfer uplink and downlink data packages, schedule transmissions to and/or from UEs, and/or the like. The RRHs may contain radio frequency (RF) circuitry, analog-to-digital converters, digital-to-analog converters, and/or the like for base station 210. In some implementations, the BBU may be connected to the RRHs via a "fronthaul" fiber link, which allows the RRHs to be installed at or near an antenna atop a cellular tower.

MME 215 includes one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to UE 205 via base station 210. Additionally, or alternatively, SGW 220 may perform operations associated with handing off UE 205 to and/or from an LTE network. In some implementations, SGW 220 may be configured to classify one or more traffic flows associated with UE 205 as including foreground data and/or background data. For example, SGW 220 may assign a classification, an identifier (e.g., a QCI), and/or the like to each traffic flow associated with UE 205, and base station 210 may use the classification, identifier, and/or the like to determine whether to handle each traffic flow via a licensed frequency band or an unlicensed frequency band.

PGW 225 includes one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to UE 205 via SGW 220 and base station 210. PGW 225 may record data usage information (e.g., byte usage), and may provide the data usage information to AAA 235. In some implementations, PGW 225 may be configured to classify one or more traffic flows associated with UE 205 as including foreground data and/or background data. For example, PGW 225 may assign a classification, an identifier (e.g., a QCI), and/or the like to each traffic flow associated with UE 205, and base station 210 may use the classification, identifier, and/or the like to determine whether to handle each traffic flow via a licensed frequency band or an unlicensed frequency band.

HSS 230 includes one or more devices, such as one or more server devices, capable of managing (e.g., receiving, generating, storing, processing, and/or providing) information associated with UE 205. For example, HSS 230 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 includes one or more devices, such as one or more server devices, that perform authentication, authorization, and/or accounting operations for communication sessions associated with UE 205. For example, AAA 235 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

ADC component 240 includes one or more devices, such as one or more server devices, that can be located between the EPC and network 250 and classify one or more traffic flows associated with UE 205 into foreground traffic flows and background traffic flows. In some implementations, ADC component 240 may employ one or more traffic classification methods to classify the one or more traffic flows associated with UE 205 into the foreground traffic flows and the background traffic flows. For example, in some implementations, the one or more traffic classification methods may use one or more machine learning algorithms to classify the downlink traffic based on statistical analysis of network traffic attributes (e.g., byte frequencies, distribution of packet sizes, packet inter-arrival times, and/or the like), based on packet contents (e.g., source and destination ports, source and destination IP addresses, application signatures, and/or the like), based on explicit signaling from the UE that identifies applications executing in the foreground state and the background state, and/or the like.

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
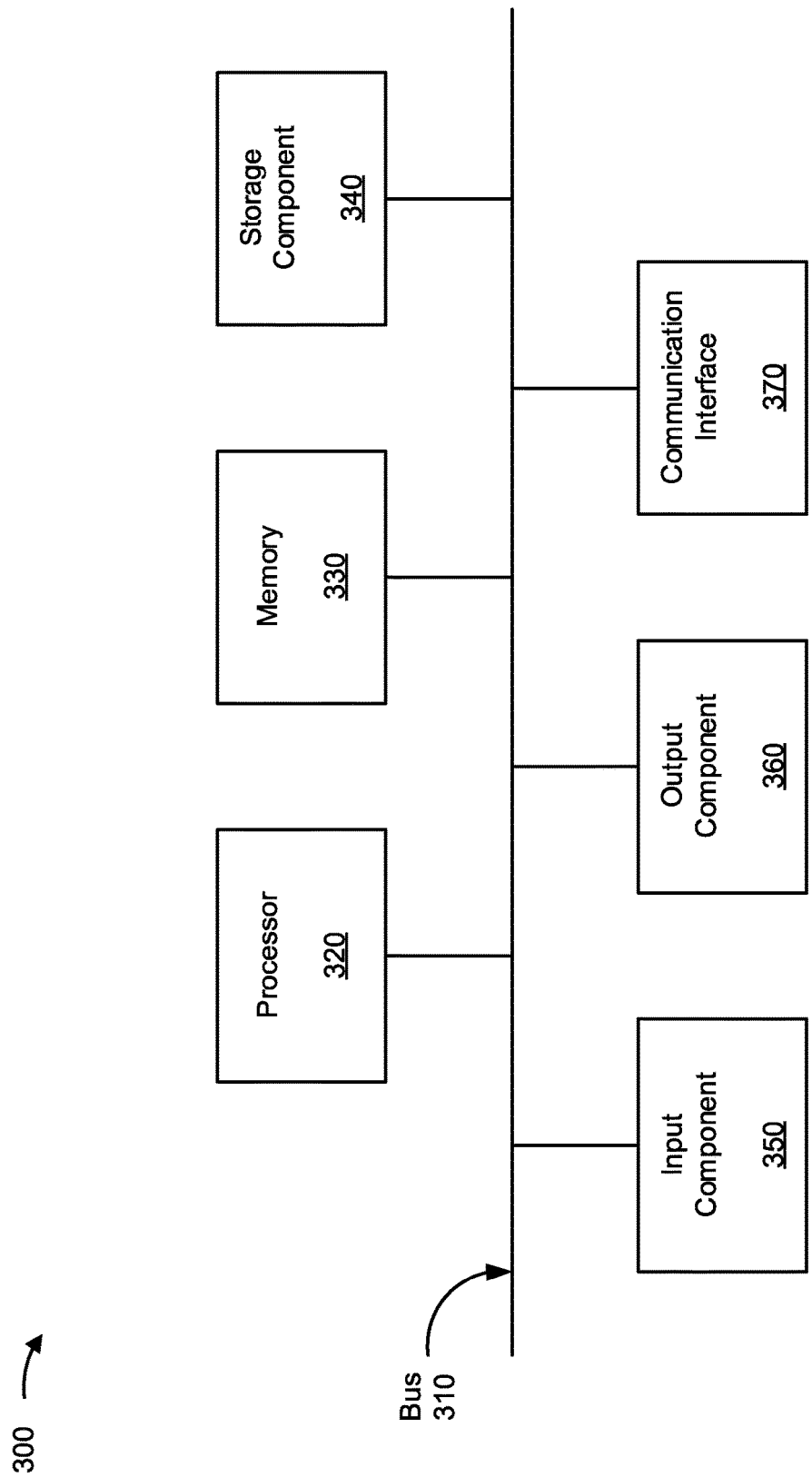
FIG. 3 is a diagram of example components of one or more devices of FIG. 2.

FIG. 3 is a diagram of example components of a device 300. Device 300 may correspond to UE 205, base station 210, MME 215, SGW 220, PGW 225, HSS 230, AAA 235, and/or ADC component 240. In some implementations, UE 205, base station 210, MME 215, SGW 220, PGW 225, HSS 230, AAA 235, and/or ADC component 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as one or more examples. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
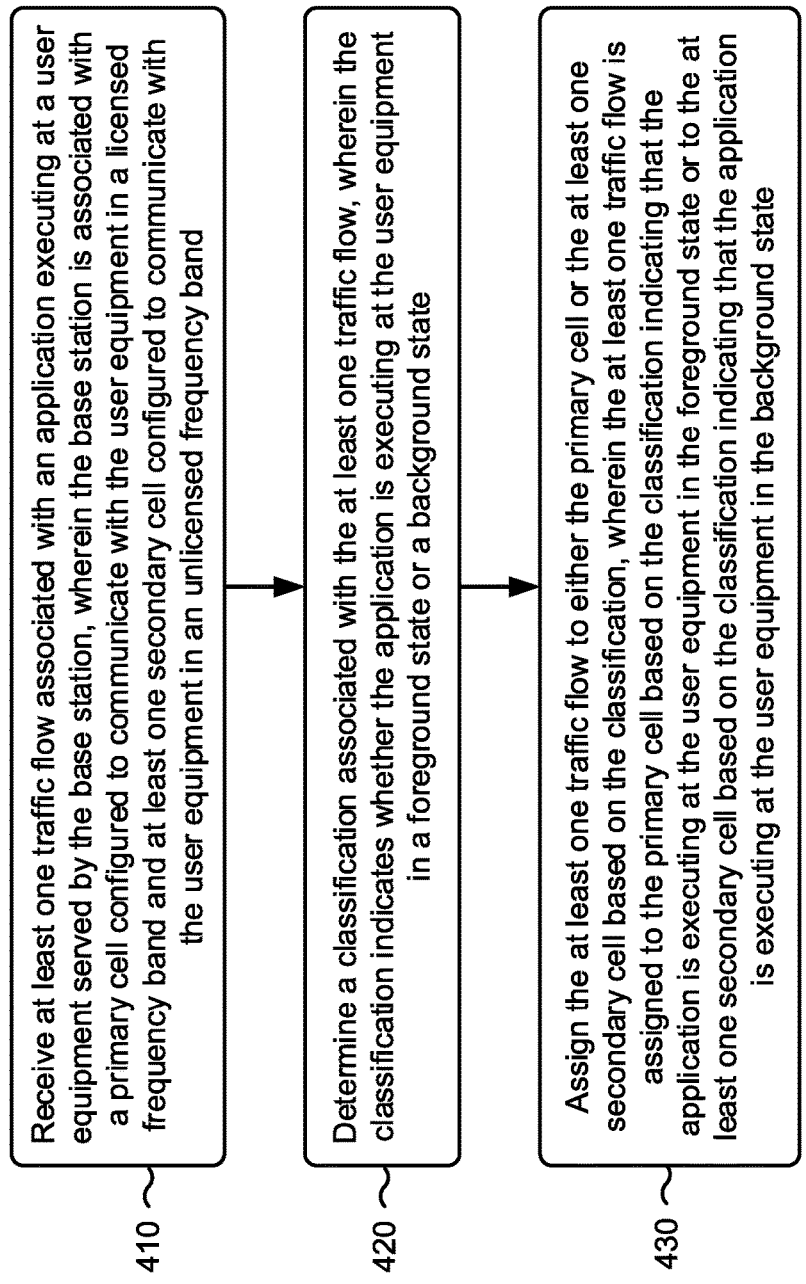
FIG. 4 is a flow chart of an example process for classifying traffic flows to enable intelligent use of spectrum.

FIG. 4 is a flow chart of an example process 400 for classifying traffic flows to enable intelligent use of spectrum. In some implementations, one or more process blocks of FIG. 4 may be performed by a base station (e.g., base station 210), which may include one or more baseband units configured to coordinate scheduling for transmissions related to the classified traffic flows and one or more remote radio heads configured to carry out the scheduled transmissions related to the classified traffic flows. Additionally, or alternatively, in some implementations, one or more process blocks of FIG. 4 may be performed by another device or a group of devices separate from or including the base station, such as a user equipment (UE) (e.g., UE 205), an MME (e.g., MME 215), an SGW (e.g., SGW 220), a PGW (e.g., PGW 225), an HSS (e.g., HSS 230), an AAA (e.g., AAA 235), and/or an ADC (e.g., ADC component 240).

As shown in FIG. 4, process 400 may include receiving at least one traffic flow associated with an application executing at a UE served by the base station, wherein the base station is associated with a primary cell configured to communicate with the UE in a licensed frequency band and at least one secondary cell configured to communicate with the UE in an unlicensed frequency band (block 410). For example, the base station (e.g., using processor 320, memory 330, storage component 340, communication interface 370, and/or the like) may receive at least one traffic flow associated with an application executing at a UE served by the base station, as described above. In some implementations, the base station may be associated with a primary cell configured to communicate with the UE in a licensed frequency band and at least one secondary cell configured to communicate with the UE in an unlicensed frequency band (e.g., a portion of radio spectrum used for wireless local area network (WLAN) communications).

As further shown in FIG. 4, process 400 may include determining a classification associated with the at least one traffic flow, wherein the classification indicates whether the application is executing at the UE in a foreground state or a background state (block 420). For example, the base station (e.g., using processor 320, memory 330, storage component 340, communication interface 370, and/or the like) may determine a classification associated with the at least one traffic flow, as described above. In some implementations, the classification may indicate whether the application is executing at the UE in a foreground state or a background state.

In some implementations, the base station may be associated with a radio access network (RAN) in which an application detection and control node assigns the classification to the at least one traffic flow based on a type of data contained in the at least one traffic flow (e.g., based on statistical analysis of network traffic attributes, user behavior patterns, and/or the like). Additionally, or alternatively, the classification may be determined based on deep packet inspection, signaling received from the UE that indicates whether the application is executing at the UE in the foreground state or the background state, an identifier that may define a priority level associated with the at least one traffic flow (e.g., a Quality of Service (QoS) Class Identifier (QCI)), and/or the like.

As further shown in FIG. 4, process 400 may include assigning the at least one traffic flow to either the primary cell or the at least one secondary cell based on the classification, wherein the at least one traffic flow is assigned to the primary cell based on the classification indicating that the application is executing at the UE in the foreground state or to the at least one secondary cell based on the classification indicating that the application is executing at the UE in the background state (block 430). For example, the base station (e.g., using processor 320, memory 330, storage component 340, communication interface 370, and/or the like) may assign the at least one traffic flow to either the primary cell or the at least one secondary cell based on the classification, as described above. In some implementations, the at least one traffic flow may be assigned to the primary cell based on the classification indicating that the application is executing at the UE in the foreground state or to the at least one secondary cell based on the classification indicating that the application is executing at the UE in the background state.

Process 400 may include additional implementations, such as any single implementation or any combination of implementations described below and/or in connection with one or more other processes described elsewhere herein.

For example, when the at least one traffic flow is assigned to the at least one secondary cell, a listen-before-talk (LBT) procedure may be initiated at the at least one secondary cell and one or more scheduled transmissions related to the at least one traffic flow may be delayed until after the LBT procedure results in a determination that the one or more transmissions would not interfere with communications in the unlicensed frequency band.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   establishing, by a base station, a primary link from a primary cell between a user device and the base station in a licensed frequency band;
   activating, by the base station and based on one or more performance criteria, a secondary link from a secondary cell in an unlicensed frequency band,
      wherein control and signaling information is conveyed between the user device and the base station via the primary cell to enable the secondary cell to be activated or deactivated based on the one or more performance criteria, and
      wherein the primary cell communicates with the user device via a persistent anchor carrier operating in the licensed frequency band to convey the control and signaling information;
   coordinating, by the base station, communication on the licensed frequency band and the unlicensed frequency band via the primary cell; and
   assigning, by the base station, traffic to the secondary cell or the primary cell based on a traffic classification,
      wherein the traffic classification is based on whether a user is actively engaged with an application based on refresh rates associated with the application.

2. The method of claim 1, wherein the traffic classification classifies traffic into at least one of:
   one or more foreground traffic flows, or
   one or more background traffic flows.

3. The method of claim 1, wherein the one or more performance criteria are based on one or more of:
   radio conditions in the primary cell,
   uplink traffic demand associated with the user device, or
   downlink traffic demand associated with the user device.

4. The method of claim 1, wherein the traffic classification dynamically changes between foreground and background based on context.

5. The method of claim 1, wherein the traffic classification uses one or more machine learning algorithms to classify the traffic based on statistical analysis of network traffic attributes.

6. The method of claim 1, wherein the traffic classification is based on one or more of:
   an internet protocol (IP)-based traffic classification method,
   a port-based traffic classification method,
   a statistics-based traffic classification method, or
   deep packet inspection.

7. The method of claim 1, wherein assigning to the secondary cell or the primary cell based on the traffic classification includes:
   indicating the traffic classification associated with each traffic flow, of the traffic, to a gateway node,
      wherein the gateway node maps each traffic flow to Quality of Service Class Identifiers (QCIs) to schedule the traffic at the base station.

8. A non-transitory computer-readable medium storing a set of instructions, the set of instructions comprising:
   one or more instructions that, when executed by one or more processors of a base station, cause the base station to:
      establish a primary link from a primary cell between a user device and the base station in a licensed frequency band;
      activate, based on one or more performance criteria, a secondary link from a secondary cell in an unlicensed frequency band, wherein control and signaling information is conveyed between the user device and the base station via the primary cell to enable the secondary cell to be activated or deactivated based on the one or more performance criteria, and wherein the primary cell communicates with the user device via a persistent anchor carrier operating in the licensed frequency band to convey the control and signaling information;

coordinate communication on the licensed frequency band and the unlicensed frequency band via the primary cell; and assign traffic to the secondary cell or the primary cell based on a traffic classification, wherein the traffic classification is based on whether a user is actively engaged with an application based on refresh rates associated with the application.

9. The non-transitory computer-readable medium of claim 8, wherein the traffic classification classifies traffic into at least one of:

one or more foreground traffic flows, or one or more background traffic flows.

10. The non-transitory computer-readable medium of claim 8, wherein the one or more performance criteria are based on one or more of:

radio conditions in the primary cell, uplink traffic demand associated with the user device, or downlink traffic demand associated with the user device.

11. The non-transitory computer-readable medium of claim 8, wherein the traffic classification dynamically changes between foreground and background based on context.

12. The non-transitory computer-readable medium of claim 8, wherein the traffic classification uses one or more machine learning algorithms to classify the traffic based on statistical analysis of network traffic attributes.

13. The non-transitory computer-readable medium of claim 8, wherein the traffic classification is based on one or more of:

an IP-based traffic classification method, a port-based traffic classification method, a statistics-based traffic classification method, or deep packet inspection.

14. The non-transitory computer-readable medium of claim 8, wherein the one or more instructions, that cause the base station to assign to the secondary cell or the primary cell based on the traffic classification, cause the base station to:

indicate the traffic classification associated with each traffic flow, of the traffic, to a gateway node, wherein the gateway node maps each traffic flow to Quality of Service Class Identifiers (QCIs) to schedule the traffic at the base station.

15. A network device, comprising:

one or more processors configured to:

establish a primary link from a primary cell between a user device and a base station in a licensed frequency band;

activate, based on one or more performance criteria, a secondary link from a secondary cell in an unlicensed frequency band, wherein control and signaling information is conveyed between the user device and the base station via the primary cell to enable the secondary cell to be activated or deactivated based on the one or more performance criteria, and wherein the primary cell communicates with the user device via a persistent anchor carrier operating in the licensed frequency band to convey the control and signaling information;

coordinate communication on the licensed frequency band and the unlicensed frequency band via the primary cell; and assign traffic to the secondary cell or the primary cell based on a traffic classification, wherein the traffic classification is based on whether a user is actively engaged with an application based on refresh rates associated with the application.

16. The network device of claim 15, wherein the traffic classification classifies traffic into at least one of:

one or more foreground traffic flows, or one or more background traffic flows.

17. The network device of claim 15, wherein the one or more performance criteria are based on one or more of:

radio conditions in the primary cell, uplink traffic demand associated with the user device, or downlink traffic demand associated with the user device.

18. The network device of claim 15, wherein the traffic classification dynamically changes between foreground and background based on context.

19. The network device of claim 15, wherein the traffic classification uses one or more machine learning algorithms to classify the traffic based on statistical analysis of network traffic attributes.

20. The network device of claim 15, wherein the one or more processors, when assigning to the secondary cell or the primary cell based on the traffic classification, are configured to:

indicate the traffic classification associated with each traffic flow, of the traffic, to a gateway node, wherein the gateway node maps each traffic flow to Quality of Service Class Identifiers (QCIs) to schedule the traffic at the base station.

* * * * *